US008606859B2

(12) United States Patent
Collison

(10) Patent No.: US 8,606,859 B2
(45) Date of Patent: Dec. 10, 2013

(54) METHOD AND SYSTEM TO COMMUNICATE MESSAGES IN A COMPUTER NETWORK

(75) Inventor: Derek Collison, Foster City, CA (US)

(73) Assignee: Tibco Software Inc., Palo Alto, CA (US)

( * ) Notice: Subject to any disclaimer, the term of this patent is extended or adjusted under 35 U.S.C. 154(b) by 1092 days.

(21) Appl. No.: 10/687,951

(22) Filed: Oct. 17, 2003

(65) Prior Publication Data
US 2004/0139166 A1 Jul. 15, 2004

Related U.S. Application Data

(60) Provisional application No. 60/419,342, filed on Oct. 17, 2002.

(51) Int. Cl.
*G06F 15/16* (2006.01)
*G06F 15/173* (2006.01)

(52) U.S. Cl.
USPC .......................................... 709/206; 709/238

(58) Field of Classification Search
USPC .......................................... 709/204–207, 238
See application file for complete search history.

(56) References Cited

U.S. PATENT DOCUMENTS

| | | | | |
|---|---|---|---|---|
| 6,058,389 A * | 5/2000 | Chandra et al. | ................... | 707/1 |
| 6,256,676 B1 * | 7/2001 | Taylor et al. | ................... | 709/246 |
| 6,332,130 B1 * | 12/2001 | Notani et al. | ................... | 705/28 |
| 6,347,307 B1 * | 2/2002 | Sandhu et al. | .............. | 705/36 R |
| 6,510,429 B1 * | 1/2003 | Todd | ............................ | 705/36 R |
| 6,549,956 B1 * | 4/2003 | Bass et al. | ...................... | 719/328 |
| 6,721,779 B1 * | 4/2004 | Maffeis | ......................... | 709/202 |
| 6,738,975 B1 * | 5/2004 | Yee et al. | ....................... | 719/310 |
| 6,877,023 B1 * | 4/2005 | Maffeis et al. | ................. | 709/202 |
| 6,915,519 B2 * | 7/2005 | Williamson et al. | .......... | 719/313 |
| 6,954,792 B2 * | 10/2005 | Kang et al. | ..................... | 709/229 |
| 6,970,945 B1 * | 11/2005 | Berkman et al. | .............. | 709/246 |
| 6,990,534 B2 * | 1/2006 | Mikhailov et al. | ............ | 709/250 |
| 6,996,570 B2 * | 2/2006 | Noble et al. | .................... | 707/100 |
| 7,039,671 B2 * | 5/2006 | Cullen | .......................... | 709/201 |
| 7,080,381 B2 * | 7/2006 | Hannigan et al. | ............. | 719/313 |
| 7,152,094 B1 * | 12/2006 | Jannu et al. | .................... | 709/206 |
| 7,254,579 B2 * | 8/2007 | Cabrera et al. | .................. | 707/10 |
| 7,352,762 B2 * | 4/2008 | T V et al. | ....................... | 370/412 |
| 2001/0047385 A1 * | 11/2001 | Tuatini | .......................... | 709/203 |

(Continued)

OTHER PUBLICATIONS

Raj, Gopalan Suresh. Java Message Service (JMS). [Retrieved from internet on Aug. 28, 2007: <http://my.execpc.com/~gopalan/jms/jms.html>].*

(Continued)

*Primary Examiner* — Aaron Strange
(74) *Attorney, Agent, or Firm* — Baker & McKenzie LLP

(57) ABSTRACT

A method includes communicating in a computer network a first message in a publish-subscribe arrangement or a queuing arrangement, and communicating a second message in a publish-subscribe arrangement or a queuing arrangement. The second message may be derived from the first message. The publish-subscribe arrangement may include a topic to which at least one of the first and second messages is sent, and the queuing arrangement may include a queue to which at least one of the first and second messages is sent. The second message may be derived from the first message by bridging a source and a target destination. The invention extends to a machine-readable medium embodying a sequence of instructions that, when executed by a machine, cause the machine to execute the method.

21 Claims, 8 Drawing Sheets

(56) References Cited

U.S. PATENT DOCUMENTS

| | | | |
|---|---|---|---|
| 2002/0078132 A1* | 6/2002 | Cullen et al. | 709/201 |
| 2002/0178273 A1* | 11/2002 | Pardo-Castellote et al. | 709/230 |
| 2002/0184408 A1* | 12/2002 | Hannigan et al. | 709/328 |
| 2003/0018714 A1* | 1/2003 | Mikhailov et al. | 709/203 |
| 2003/0033212 A1* | 2/2003 | Sandhu et al. | 705/26 |
| 2003/0039350 A1* | 2/2003 | Holmen | 379/265.09 |
| 2003/0055951 A1 | 3/2003 | Chemali | |
| 2003/0115366 A1* | 6/2003 | Robinson | 709/248 |
| 2003/0189946 A1* | 10/2003 | Yajnik et al. | 370/428 |
| 2004/0064821 A1* | 4/2004 | Rousselle | 719/310 |
| 2004/0125798 A1* | 7/2004 | Hondo et al. | 370/389 |
| 2004/0254993 A1* | 12/2004 | Mamas | 709/206 |

OTHER PUBLICATIONS

Roussell, Philip. Implementing the JMS Publish/Subscribe API. Apr. 1, 2002. [Retrieved from internet on Aug. 28, 2007: <http://www.ddj.com/java/184405018>].*

BEA Systems, Inc., "WebLogic Server and WebLogic Express Administration Guide", Sep. 6, 2002, Release 7.0.*

Search Report, "International Searching Authority", PCT/US03/33064, (Oct. 17, 2003).

* cited by examiner

METHOD AND SYSTEM TO COMMUNICATE MESSAGES IN A COMPUTER NETWORK

CROSS REFERENCE TO RELATED APPLICATION

The present application claims the benefit of the filing date of U.S. provisional application Ser. No. 60/419,342, filed Oct. 17, 2002.

FIELD OF THE INVENTION

The present invention relates generally to the field of messaging and, more specifically, to a system and method to communicate messages in a computer network.

BACKGROUND OF THE INVENTION

Messaging is a method of communication between software components or applications. A messaging system may be a peer-to-peer facility wherein a messaging client sends messages to, and receives messages from, any other client. In other embodiments, the messaging system may be server based wherein a server process brokers messages between client applications.

Messaging enables distributed communication that is loosely coupled. A sender may send a message to a destination, and a receiver can retrieve the message from the destination. However, the sender and the receiver need not be available at the same time in order to communicate. In certain scenarios, the sender need not know anything about the receiver and, likewise, the receiver need to know anything about the sender. However, the sender and the receiver may need to know what format the message is in and what destination should be used. In this respect, messaging differs from tightly coupled technologies, such as Remote Method Invocation (RMI), which require an application to know a remote application's methods.

Messaging also differs from electronic mail (e-mail), which is a method of communication between people or between software applications and people.

Prior art messaging systems, however, typically provide two distinct and independent messaging paradigms: publish-subscribe and queuing. Sun's Java Messaging Service (JMS) is an example of a widely used API specification used in messaging systems (see URL address java.sun.com/products/jms/docs.html for exemplary JMS specifications). An exemplary implementation of the JMS specification is the TIBCO Enterprise™ for JMS messaging system.

SUMMARY OF THE INVENTION

In accordance with the invention, there is provided a method of communicating a message in a computer network, the method including:
  communicating a first message in at least one of a publish-subscribe arrangement and a queuing arrangement; and
  communicating a second message in at least one of a publish-subscribe arrangement and a queuing arrangement, wherein the second message is derived from the first message.

The publish-subscribe arrangement may include a topic to which at least one of the first and second messages is sent, and the queuing arrangement may include a queue to which at least one of the first and second messages is sent. In one embodiment, the publish-subscribe arrangement includes a topic to which both the first and the second messages are sent.

In another embodiment, the queuing arrangement includes a queue to which both the first and the second messages are sent.

In one embodiment, deriving the second message from the first message includes bridging a source and a target destination, wherein the source and target destinations are selected from the group consisting of a publish-subscribe arrangement and a queuing arrangement. The bridge may be a software bridge.

The invention extends to a system for communicating a message in a network and to a machine-readable medium including instructions for executing any one of the methods described herein.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
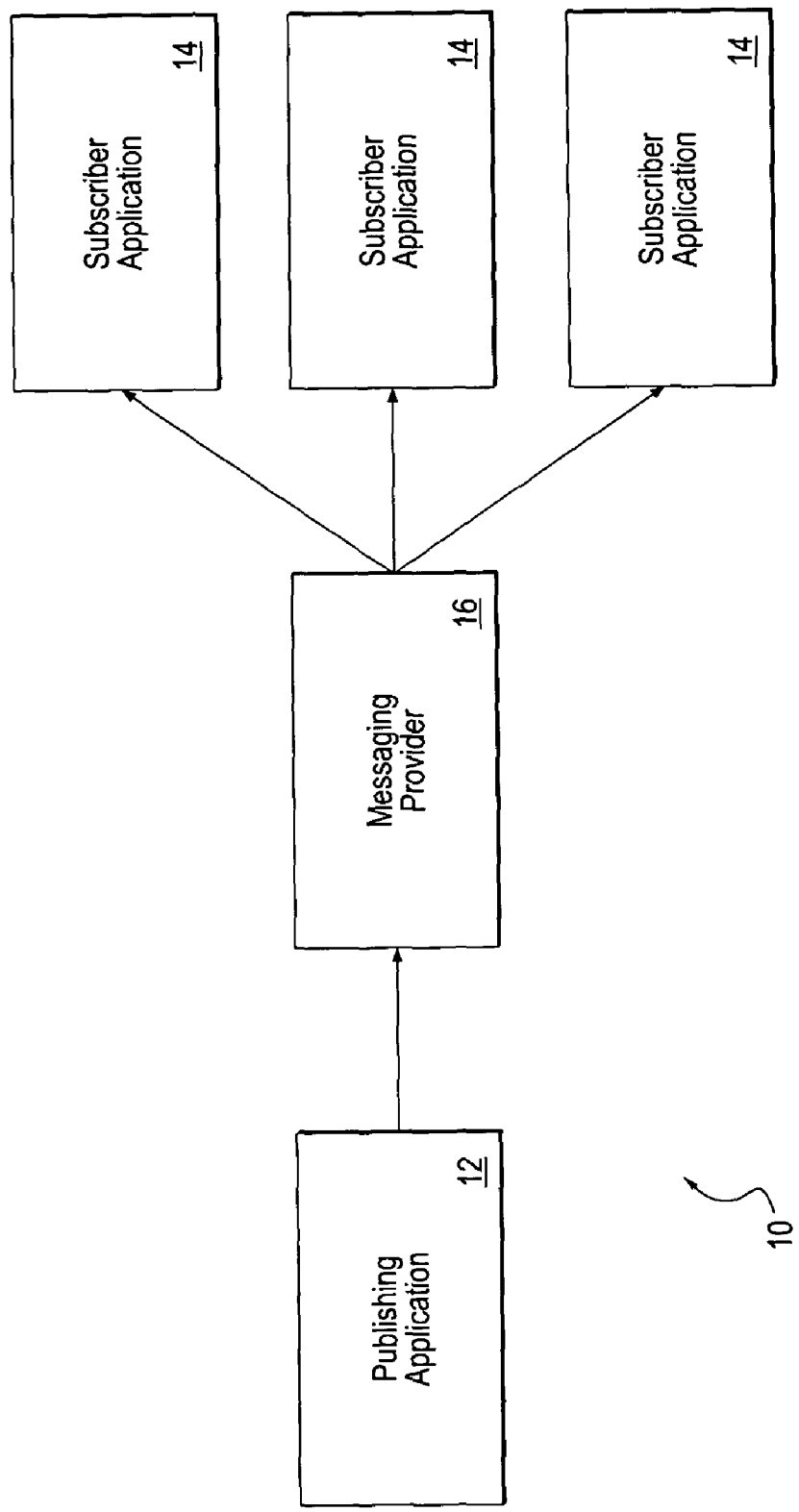
FIG. 1 shows a schematic representation of a publish-subscribe messaging system according to the prior art.

A method and system for messaging in a computer network is described. The method and system, in accordance with the invention, allows publish-subscribe (PS) and queuing (Q) to be simultaneously performed, as described in more detail below. In one embodiment, the method and system allows messages to be sent to multiple destinations of any combination of types in a single operation, for example, PS+Q, PS+PS, PS+PS+Q, Q+Q, etc. This embodiment may allow multiple destinations, each of which may have the same or different delivery semantics, to be utilized together, with the bridging under administrative control that is transparent to the sending and receiving applications.

In the following description, for purposes of explanation, numerous specific details are set forth in order to provide a thorough understanding of the present invention. It will be evident, however, to one skilled in the art, that the present invention may be practiced without these specific details.

The embodiment is described in the drawings, by way of example, with reference to TIBCO's Enterprise for JMS implementation of Sun's Java Message Service (JMS). However, it is to be appreciated that the invention may be applied in any messaging environment providing a queuing arrangement and a publish-subscribe arrangement. Sun's JMS, for example, provides two distinct messaging paradigms, namely topic-based publish-subscribe and queuing.

Referring to FIG. 1 of the drawings, reference numeral 10 generally indicates an exemplary publish-subscribe messaging system. The publish-subscribe messaging system 10 directs a message from a publishing application 12 to one or more receiver or subscriber applications 14 via a messaging provider 16. Typically, the publishing application 12 (e.g. a messaging client) publishes a message on a topic, and the message is automatically delivered to one or more subscriber applications 14 (e.g. other messaging clients) that have registered an interest in, or subscribed to, that topic. A large number of topics may be provided that, for example, identify subject matter to which the messages relate. Further, in some embodiments, topics may include a plurality of parts. For example, in the TIBCO Enterprise for JMS, topics are multipart strings, in which the parts are separated by periods. Example topics may include EQ.TIBX.PRICE and INVENTORY.STATUS. It is however to be appreciated that the actual topics or interest areas may differ from one embodiment of the invention to another as the messaging layer (not the applications) may dictate the syntax of topics.

Each subscriber application 14 may subscribe on exact topics (e.g., INVENTORY.STATUS.USA), and/or they may subscribe to a dynamically calculated set of topics by using wildcard (e.g., pattern-matching) characters. For example, the TIBCO Enterprise for JMS, as an exemplary embodiment, supports two wildcard characters:

(1) an asterisk ("*") character may be used to substitute for any part of a topic; and
(2) a greater than (">") character may be used to substitute for any number of trailing topic parts.
For example, EQ.*.PRICE matches any three-part topic whose first part is EQ and whose third part is PRICE. Similarly, INVENTORY.>matches any topic whose first part is INVENTORY, and has any number of trailing parts.

It is however to be appreciated that other or different pattern-matching characters may be supported in other embodiments of the invention.

Figure 2:
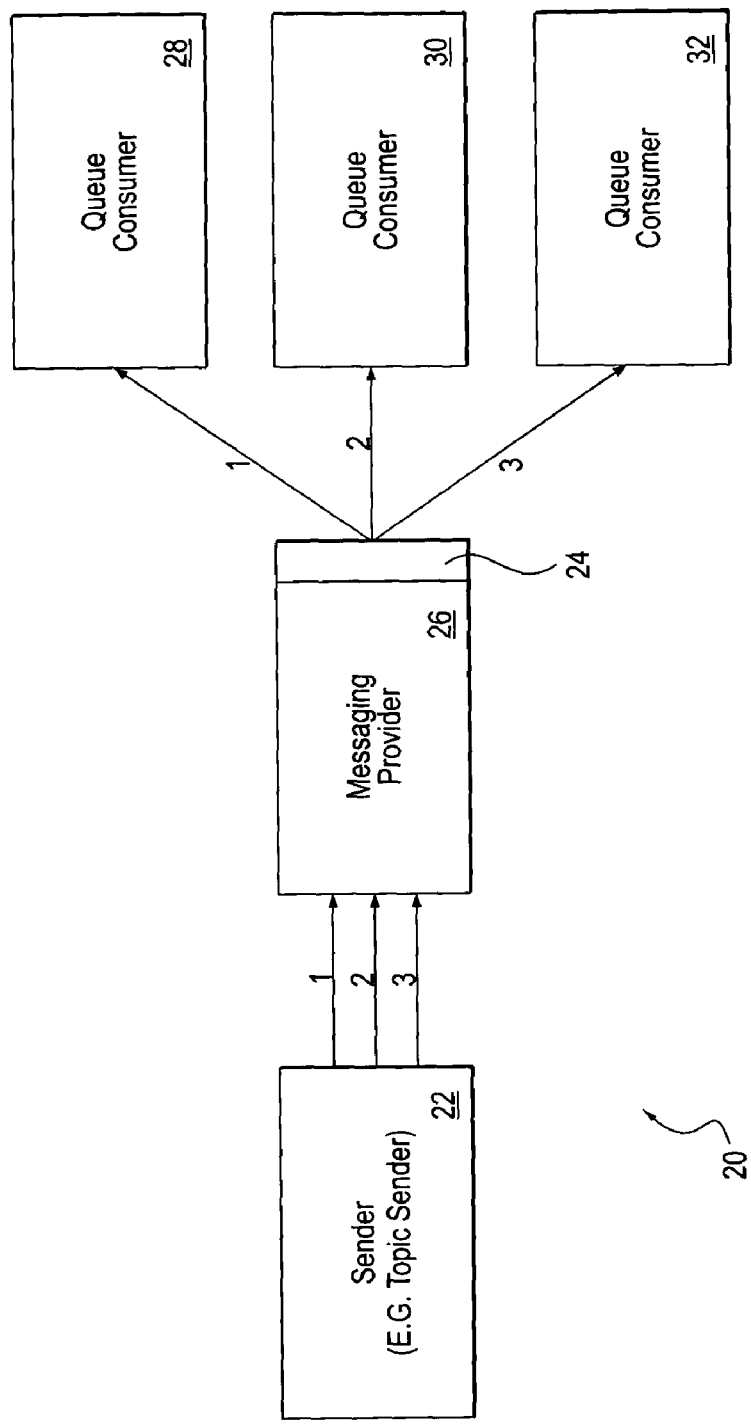
FIG. 2 shows a schematic representation of a queuing messaging system according to the prior art.

Referring to FIG. 2, reference numeral 20 generally indicates an exemplary queuing messaging system. Unlike the system 10 that spawns the message to all subscriber applications 14 that have subscribed to the message topic, the system 20 directs a message from a sender 22 to a message queue 24 provided at a messaging provider 26. The messaging provider 26 may be a messaging agent that allows a receiver or queue consumer 28, 30, 32 (only three of which are shown by way of example in the drawings) to de-queue the message for consumption. However, in the system 20, queue consumers 28 to 32 may de-queue messages from the same queue, but each message can only be de-queued at most once. Thus, each message has only one ultimate destination. This allows multiple applications feeding off a single queue to form a load-balanced pool. Queues can also treat consumers in Primary/Secondary fashion, in which a Primary consumer gets all messages until it fails, at which point a Secondary consumer is essentially promoted to Primary status. Queue names may follow the same exemplary multipart convention as described above with reference to the topics. Collectively, the topic and queue names may be called destinations.

Two differences can be observed between publish-subscribe and queuing systems 10, 20 respectively. Firstly, a message published by the system 10 on a topic may be received by multiple subscriber applications, while a message sent to the queue 24 by the system 20 may be de-queued by only one receiver or queue consumer 28 to 32.

Secondly, messages published on a topic by the system 10 are delivered to those subscriber applications 14 who have registered a subscription prior to message publication and, if there are no subscribers at the time of publication, the message is not sent. Thus, in order to receive a particular message, the subscriber applications 14 must subscribe to the topic prior to the publishing application 12 sending the message. However, in the system 20, messages sent to the queue 24 persist in the queue until they are consumed (or expire, if the messaging system allows unconsumed messages to be removed on a time-to-live basis). Thus, none of the queue consumers 28 to 32 need exist prior to the message being sent, for the message to be eventually delivered successfully.

In many cases, one messaging paradigm or the other is sufficient, however, for some business problems, a delivery mode that combines the semantics of publish-subscribe (e.g., point-to-multipoint) and queuing (e.g., point-to-point) provides for a simpler, more tractable solution. For example:

Application X: The publishing application 12 may publish messages to a large number of topics, and these messages may be received by a large number of subscriber applications 14. A copy of every message may also need to be written to a database for backup and data-mining.

Application Y: The sender 22 may send messages to the queue 24 for load-balanced consumption by queue consumers 28 to 32, but at the same time, several monitoring applications may need to review each message.

Although these problems can be addressed with the two separate messaging paradigms (e.g. a publish-subscribe system 10 and a separate queuing system 20), the solutions may be difficult to manage. For example, in the Application X, the subscriber applications 14 of the publishing application 12 could individually write each message to the database. In the Application Y, the sender 22 could send each message twice, for example, first to the load-balanced queue 24, and second to a topic on which monitoring applications subscribe.

A difficulty in both of these solutions is that the applications themselves must be responsible for implementing behavior that is not necessarily part of their own business function. For the first example, new subscribers must be guaranteed access to the database, which may be difficult in a geographically distributed environment. Further, administrators would need to certify that new subscribers do, in fact, log their messages. For the second example, any new sender must be charged with sending each message twice, and must be knowledgeable of both the relevant queue and topic.

Figure 3:
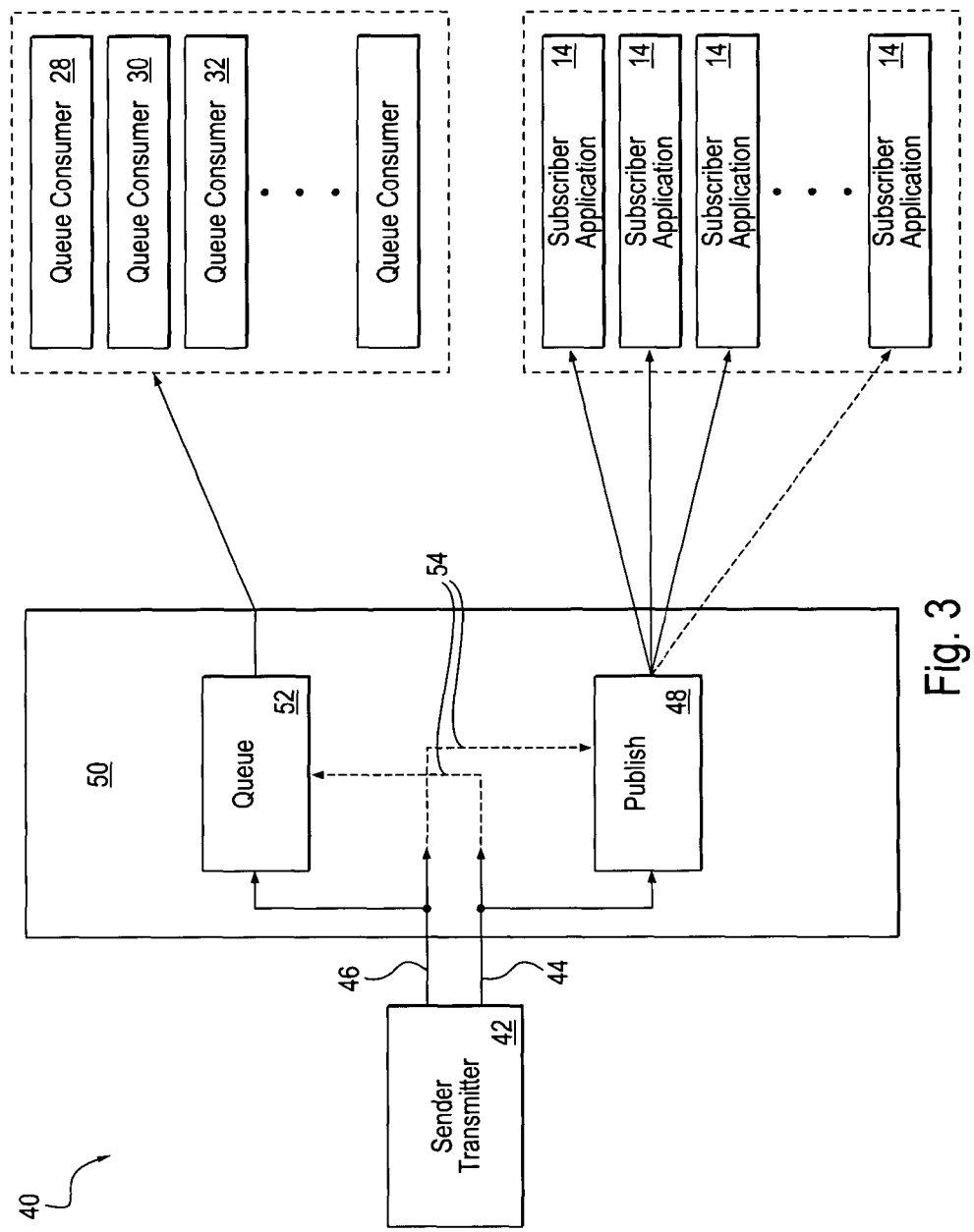
FIG. 3 shows a schematic representation of a messaging system in accordance with one embodiment of the invention.

Referring to FIG. 3 of the drawings, reference numeral 40 generally indicates a messaging system or arrangement, in accordance with the invention, to communicate a message to a message recipient. In particular, as described in more detail below, the system 40 combines publish-subscribe and queuing messaging arrangements so that a published message can also be queued and a queued message can also be published. Although described with reference to publish-subscribe and queuing messaging, it is to be appreciated that the invention illustrated in FIG. 3 may also apply equally to any point-to-point and point-to-multipoint (wherein the multi-point may even represent zero or one point) messaging paradigm. In other embodiments of the invention, a source destination may be bridged to any number of target destinations, and the source and targets may be any combination of topics and queues.

The system 40 includes a sender 42 (e.g., a messaging client) which may correspond to the publishing application 12 (e.g., a topic publisher) and/or the sender 22 (e.g. a queue sender) shown in FIGS. 1 and 2. Accordingly, the sender 42 may provide a message for publication, as shown by line 44, and/or provide a message for queuing, as shown by line 46. Published messages (see line 44) are communicated to a publish module 48 of a messaging provider 50 (e.g., a messaging agent), and queued messages (see line 46) are communicated to a queue module 52 of the message provider 50. As described in more detail below, the message provider 50 includes a bridge 54 (software or hardware) that bridges a queued message on line 46 to the publish module 48, and/or a publish message on line 44 to the queue module 52. Thus, a publish message may be queued without any software or hardware modification to the publishing application 12 or the subscriber application 14. Likewise, a queued message can be published without modification to the sender 22 or the queue consumers 28 to 32. Although the invention is described, by way of example, with reference to topic-to-queue and queue-to-topic bridging, it is to be appreciated that the invention may be applied in bridging any destination to any number of other destinations, in any combination of queues and topics and is not limited to queue-to-topic or topic-to-queue bridging. Further, in certain embodiments of the invention, multiple bridges may be employed in parallel, for overlapping or non-overlapping pairs/sets of destinations. In one embodiment, the exemplary bridge 54 of the system 40 allows two destinations (a destination being either a publish-subscribe topic or a queue name, or a wildcard pattern) to be "connected" whereby automatic routing is provided to both the original and bridged destination.

Figure 4:
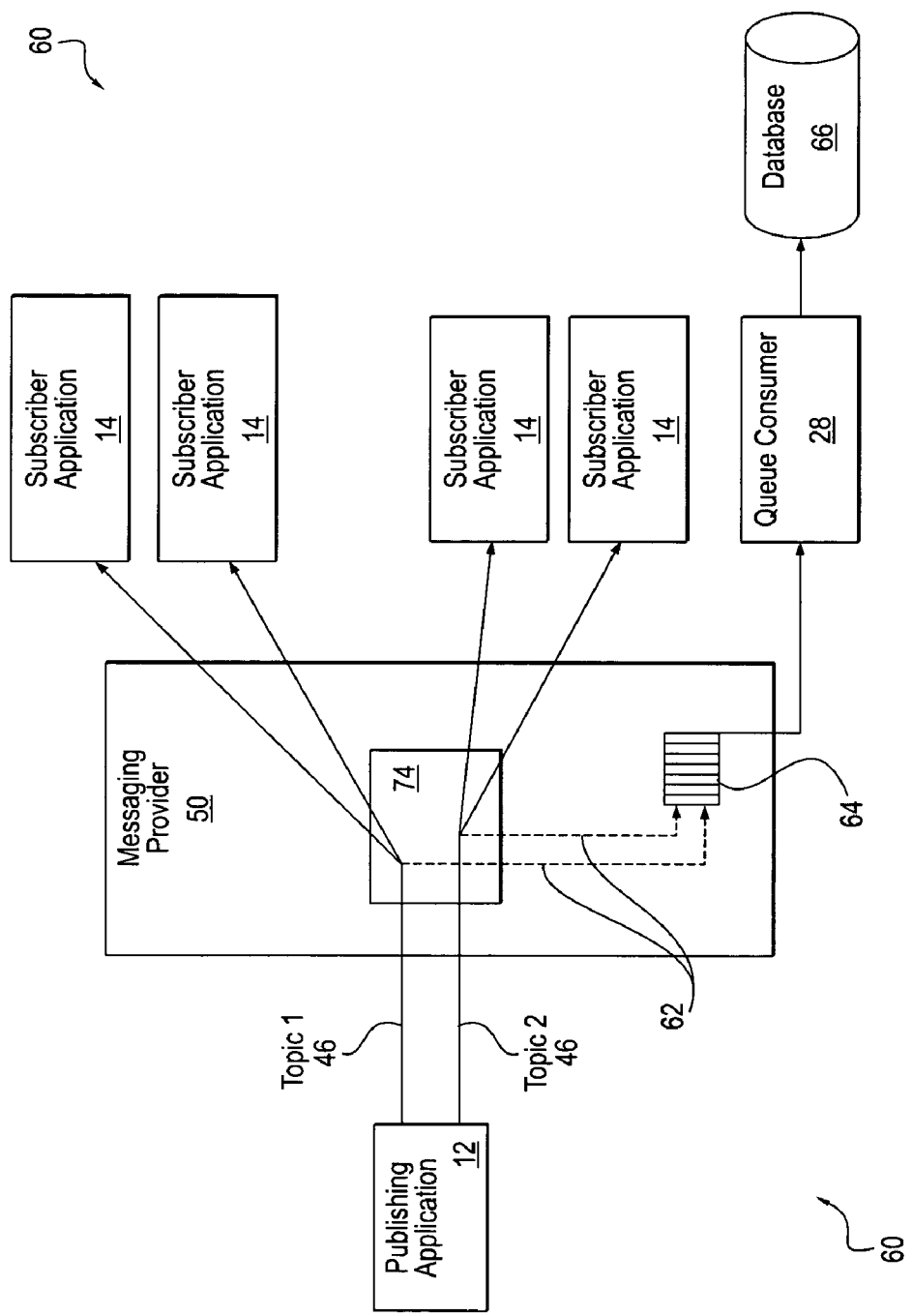
FIG. 4 shows a schematic representation of a further exemplary embodiment of a messaging system in accordance with the invention.

Referring in particular to FIG. 4 of the drawings, reference numeral 60 shows an exemplary embodiment of the system 40 configured to address Application X's requirement (as discussed above) where all topic-based traffic is be copied to a database. Unlike the bridge 54 in FIG. 3, which shows the bridging on both publish and queuing messages, the system 60 includes a bridge 62 that is set up for topics to be bridged to a single queue 64 servicing a database 66. Thus, each message sent on a topic is delivered both to subscriber applications 14 on matching topics, and to the queue 64. The queue 64 can then be served by an application that writes the messages to the database 66. As mentioned above, it is, however, to be appreciated that the bridge 62 (which may include a plurality of bridges) may be a software bridge that bridges any number of topics and/or queues to any number of topics and/or queues. The bridging may thus take place without any modification to the publishing application 12 and/or the subscriber applications 14 or the queue consumer 28.

Figure 5:
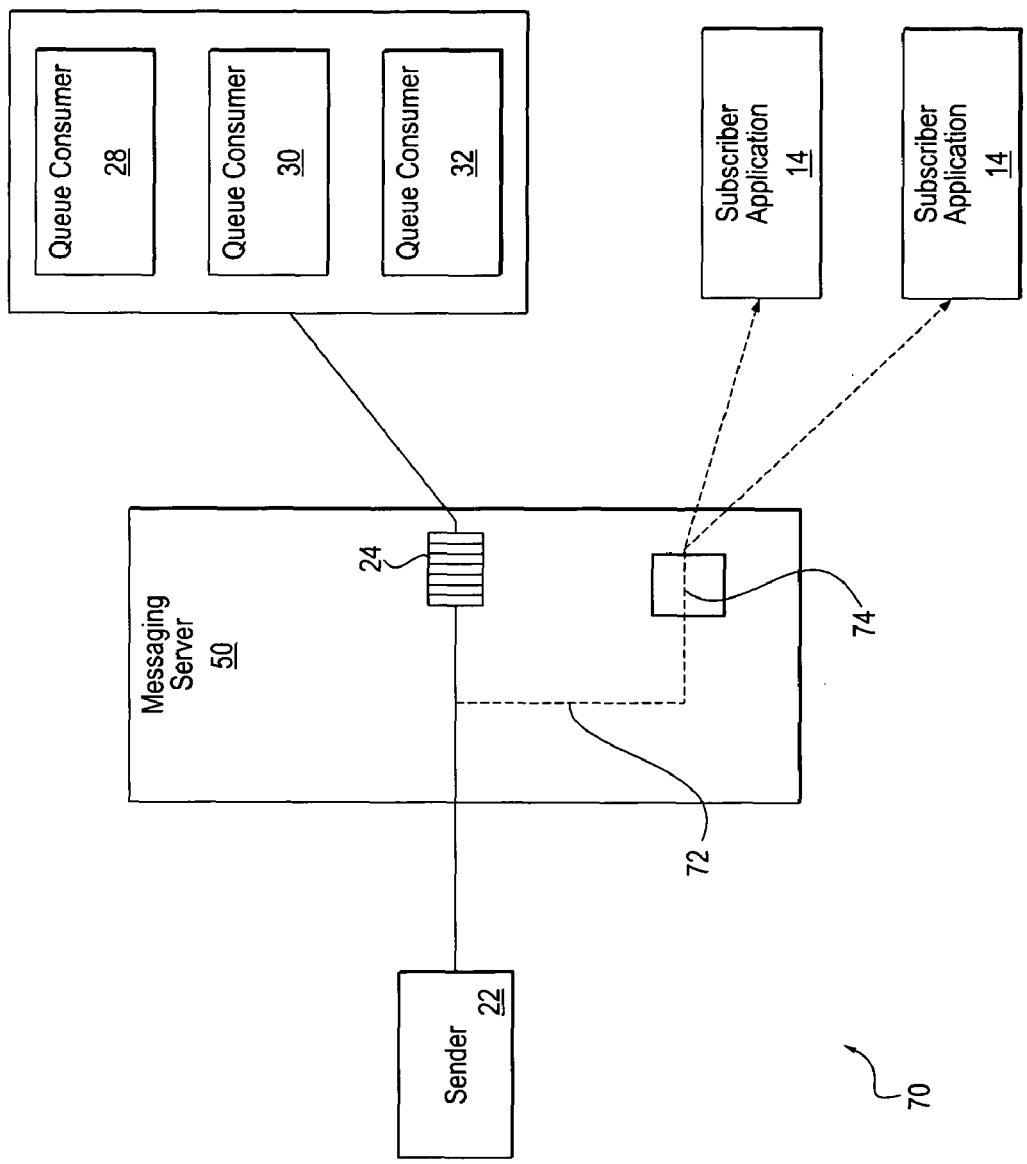
FIG. 5 shows a schematic representation of a yet further exemplary embodiment of a messaging system in accordance with the invention.

Referring in particular to FIG. 5, reference numeral 70 shows an exemplary embodiment of the system 40 configured to address Application Y's requirement (as discussed above) where a queue that serves as the basis of the load-balanced pool is bridged to a topic, allowing both the load-balanced consumers to retrieve the original message from the queue, and additional consumers to receive copies of the message via subscription.

Unlike the exemplary bridge 54 in FIG. 3, which shows bridging on both publish-subscribe and queuing messages, the system 70 includes an exemplary bridge 72 that is set up for one or more queued messages to be bridged to a publish module 74 that may publish the message to subscriber applications 14. Thus, each message sent to a queue is delivered both to the queue 24 and to the subscriber applications 14 on matching of topics. It is, however, to be appreciated that the bridge 72 (which may include a plurality of bridges) may bridge any number of queues thereby to publish queued messages. The bridging may thus take place without any hardware or software modification to the applications of the sender 22 and/or the queue consumers 28 to 32 or the subscriber applications 14. If, however, this semantic were to be implemented in the applications themselves, such tightly coupled senders and receivers (e.g., in the case of Application Y, the sender would need to know the specific topic on which subscribers were to be copied) would be difficult to administer. In the case of a distributed network where messaging clients are provided at remotely located geographical sites, such application-based bridging may be difficult to coordinate or implement.

As mentioned above, the invention may be applied in bridging any destination to any number of other destinations, in any combination of queues and topics. For example, in one exemplary embodiment, destination bridges may be configured between source destinations and target destinations. In one embodiment, any combination of topics and queues can be bridged. When a message is sent by an application (e.g., a messaging client), it may thus be delivered to the original source destination, as well as any target or bridged destinations to which that source is bridged. For example, if the Application Y (see FIG. 5) has a queue 24 named QUEUE.WORK and a topic called TOPIC.WORK, and the bridge 72 links the former to the latter, any message sent to QUEUE.WORK, will be available both to queue consumers of QUEUE.WORK (source destination), as well as topic subscribers of TOPIC.WORK (target destination) via the publish module 74.

Similarly, for the Application X (see FIG. 4), a bridge 62 can be set up from the source topic destination>(which matches all topic destinations) to a target queue destination QUEUE.DB (see queue 64). A single application (queue consumer 28) servicing QUEUE.DB can then de-queue messages (copies of those sent originally to a topic) and write them to the database 66. In certain embodiments, use of a wildcard in the source destination may be dynamic and, accordingly, any new destinations that are added to the system 60 may automatically be bridged. In one embodiment, the bridges 54, 62 and 72 are implemented in software.

In an exemplary embodiment of the invention implemented as part of the TIBCO Enterprise for JMS, destination bridges 54, 62 and 72 may be created by editing a configuration file, such as, for example, BRIDGES.CONF.

In one exemplary embodiment, the bridge specification may be as follows:
 [topic:SOURCE.TOPIC]
 queue=TARGET.QUEUE With this exemplary software bridge in place, any messages published to the topic SOURCE.TOPIC are delivered to two places: (1) any application with a subscription that matches the topic SOURCE.TOPIC, and (2) the queue TARGET.QUEUE. Thus, neither the message sender 42, nor any of the message receivers (queue consumers 28, 30 and 32 or subscriber applications 14) need be aware of the presence of the bridge 54 (see FIG. 3).

In one embodiment, a second specification may be as follows:
 [topic: DELIVERY.*]
 queue=DELIVERIES
 topic=NOTIFICATIONS The above specification provides a bridge that may be one-to-many (point-to-multipoint). In particular, a single source destination may be bridged to multiple target destinations. The above specification may thus bridge the source destination pattern DELIVERY.* (which, itself, may match many actual topics) to two target destinations. In this example, any message published on a topic matching DELIVERY.* will be sent to three places: (1) any application with a subscription that matches the original publish topic, (2) the queue DELIVERIES, and (3) any application with a subscription that matches the topic NOTIFICATIONS. Further, it may be noted that neither the sending or receiving applications are aware (or need be aware) of the presence of the destination bridge.

A further example of an implementation of a bridge specification is as follows:

[topic: DELIVERY.*]
queue=DELIVERIES
topic=NOTIFICATIONS SELECTOR="URGENCY in ('HIGH', 'MEDIUM')"

In this example, one of the destinations has a selector added to it. Selectors are, in one exemplary embodiment, a mechanism to allow a destination to be qualified by a message-content filter. In this case, the second destination is qualified such that bridging only occurs for messages that have an exemplary urgency value of high or medium. Thus, with this bridge in place, any message published on a topic matching DELIVERY.* will be sent to two or three places, depending upon the content of the message. In particular, all messages matching the source topic are delivered to (1) any application with a subscription that matches the original publish topic, and (2) the queue DELIVERIES. But only those messages published on a matching topic and with the correct value set for URGENCY are delivered to (3) any application with a subscription that matches the topic NOTIFICATIONS.

It is to be appreciated that the software bridge is not limited to a configuration file but may take any form. For example, in alternative embodiments of TIBCO Enterprise for JMS, bridge configuration, or configurations, may be provided through the product's command-line tool and Java administration classes. In other embodiments, the software bridge may be an administrator console, a programmatic API, or the like.

In one exemplary embodiment the invention, and as implemented in the TIBCO Enterprise for JMS, a bridge delivery may not be daisy-chained. For example, if A is bridged to B, and B is bridged to C, messages sent to A will only flow to A and B, not to C. In this embodiment, messages sent to B will, of course, flow to both B and C. However, in other embodiments of the invention, bridge delivery may be daisy-chained.

Access Control

In one embodiment, the bridging functionality as described herein may observe access control. For example, the TIBCO Enterprise for JMS allows administrators to set access controls on destinations. This allows an administrator to control which topics and queues an application may send messages to and/or receive messages from.

Figure 6:
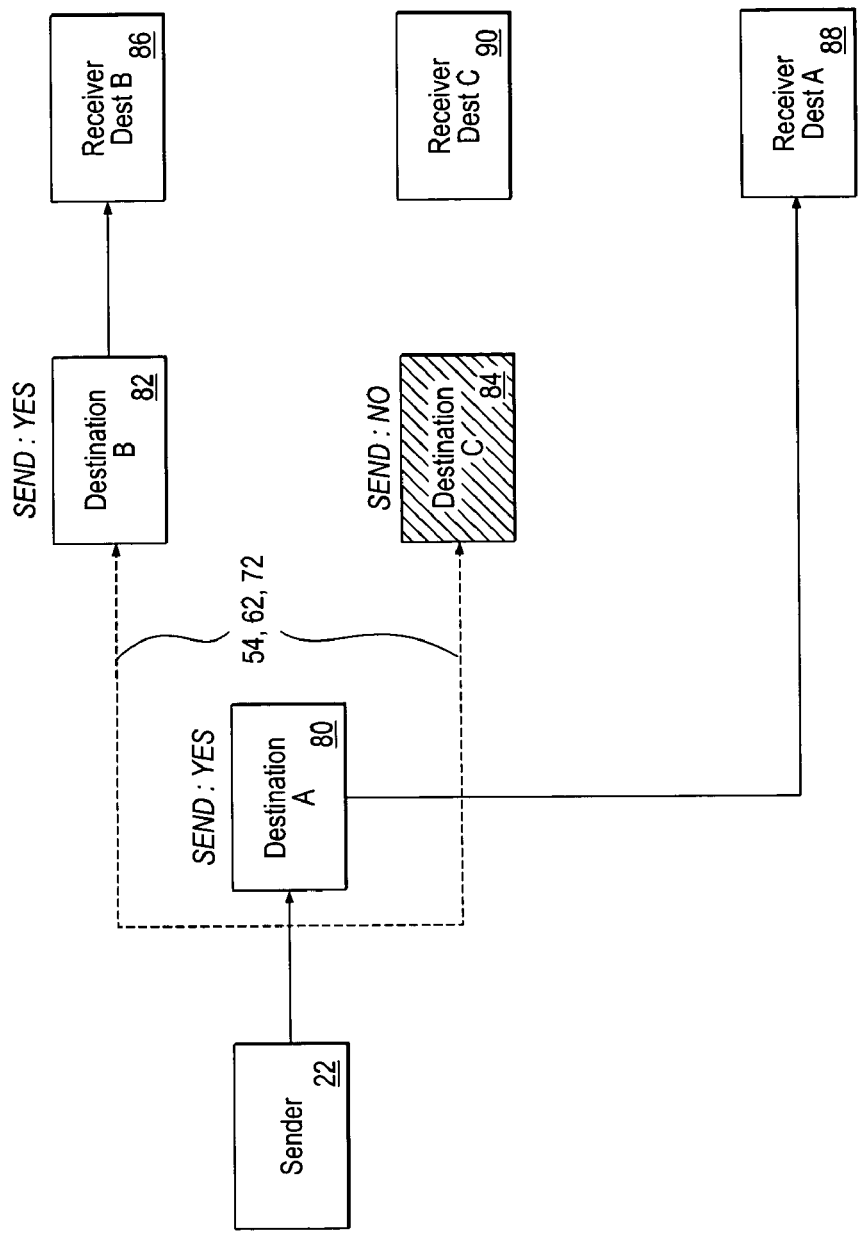
FIG. 6 shows a schematic representation of access control by an administrator in one embodiment of the present invention.

In one exemplary embodiment, the destination bridges 54, 62 and 72 observe access control parameters. For example, as shown in FIG. 6, a destination A 80 is bridged to destinations B 82 and C 84, and the sender 22 has send permission for destination B 82, but not for destination C 84, then messages sent to destination A are delivered to destination A 80 and destination B 82, but not to destination C 84, assuming, of course, that the sender 22 has permission to send a message to destination A 80 in the first place. Accordingly, receivers 86 and 88 for destinations A and B receive the message but a receiver 90 for destination C does not receive the message. In one embodiment, if the sender 22 does not have the correct permission for the initial destination, then no delivery and no bridging occurs.

In certain embodiments, access control may be observed dynamically. Thus, any change to the access control parameters will be observed by a bridge 54, 62, 72 upon a first message sent subsequent to a control change.

Transactional Control

In one exemplary embodiment, destination bridges 54,62, 72 observe transactional control. Specifically, if a sender 22 uses a transactional session, then the initial message delivery, plus all bridged deliveries may succeed or fail as a single unit-of-work. Practically, this may mean that if the sender 22 does not have the appropriate permission for any resulting destination (original or bridged), then the message is not delivered at all.

Figure 7:
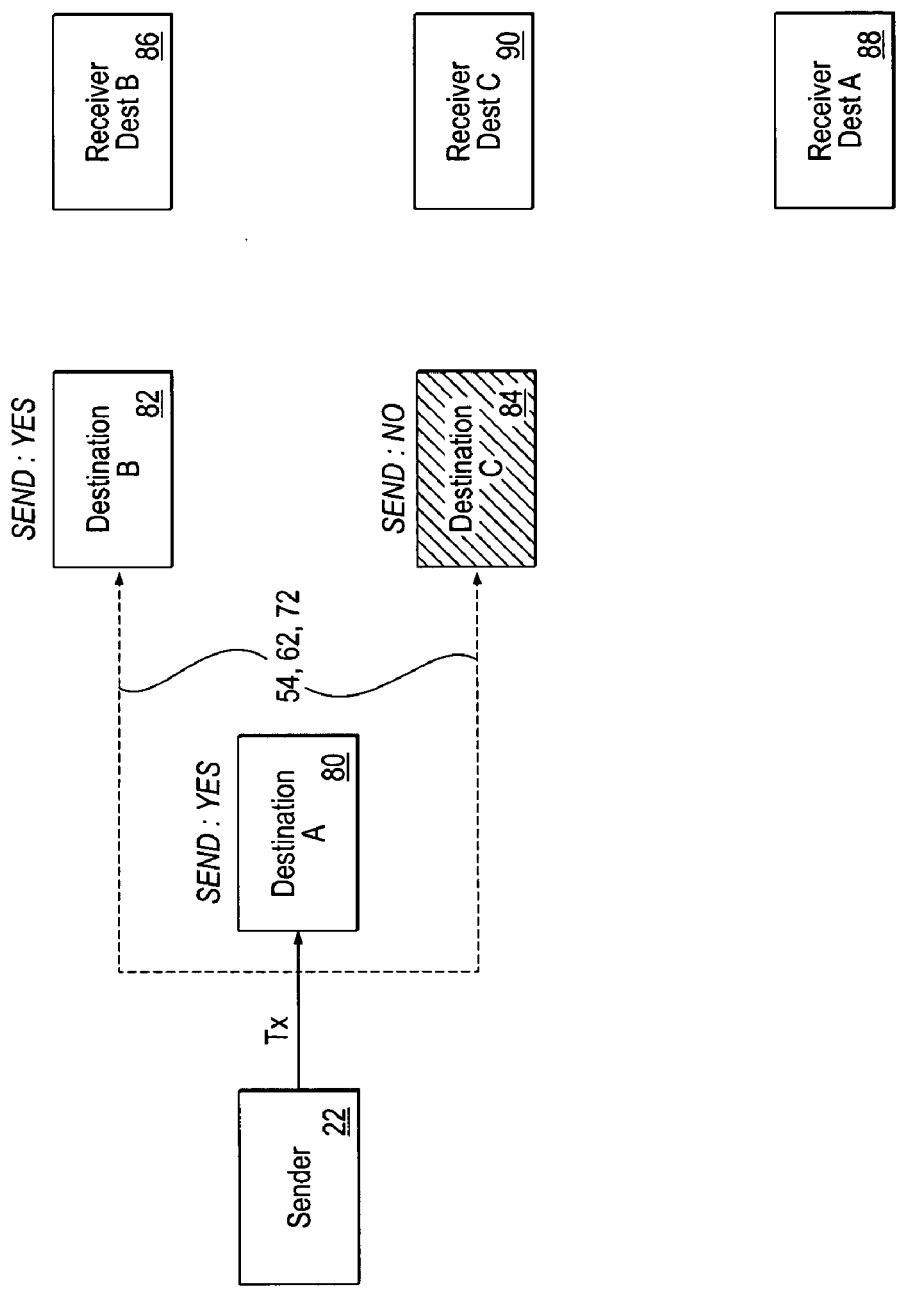
FIG. 7 shows a schematic representation of transaction control by the sender in another embodiment of the present invention.

For example, as shown in FIG. 7, if destination A 80 is bridged to destination B 82 and destination C 84, and the sender 22 has send permission to send to destination A 80 and B 82, but not to destination C 84, a transactional send to destination A 80 will fail, resulting in no message delivery. In this embodiment, the lack of permission for sending a message to destination C 84 causes the entire transaction to fail, resulting in no message delivery to any one of the destinations A, B or C.

"Hybrid" Form of Messaging

In summary, the destination bridges 54, 62, 72 enable a hybrid form of messaging that includes both publish-subscribe and a queuing characteristics. The messaging system 40, in accordance with the invention, may address business problems that are not readily or practically solved by systems that offer only one or the other (or, in the case of JMS implementations, both, but independently).

For example, administrators may thus configure destination bridges 54, 62, 72 in the TIBCO Enterprise for JMS at the messaging provider (e.g. at a provider's server). This may allow bridges in one embodiment to be implemented without straying from the exemplary JMS API specification, and it provides decoupling of bridges 54, 62, and 72 from application programming. In another embodiment, the bridges 54, 62, 72 may be API-driven bridges that bridge any one or more arbitrary source destinations to any one or more arbitrary sets of target destinations. In one exemplary embodiment, the bridges 54, 62, 72 provide the ability to combine publish-subscribe and queuing messaging, but may be configured through application API calls, rather than by administration of a server.

Figure 8:
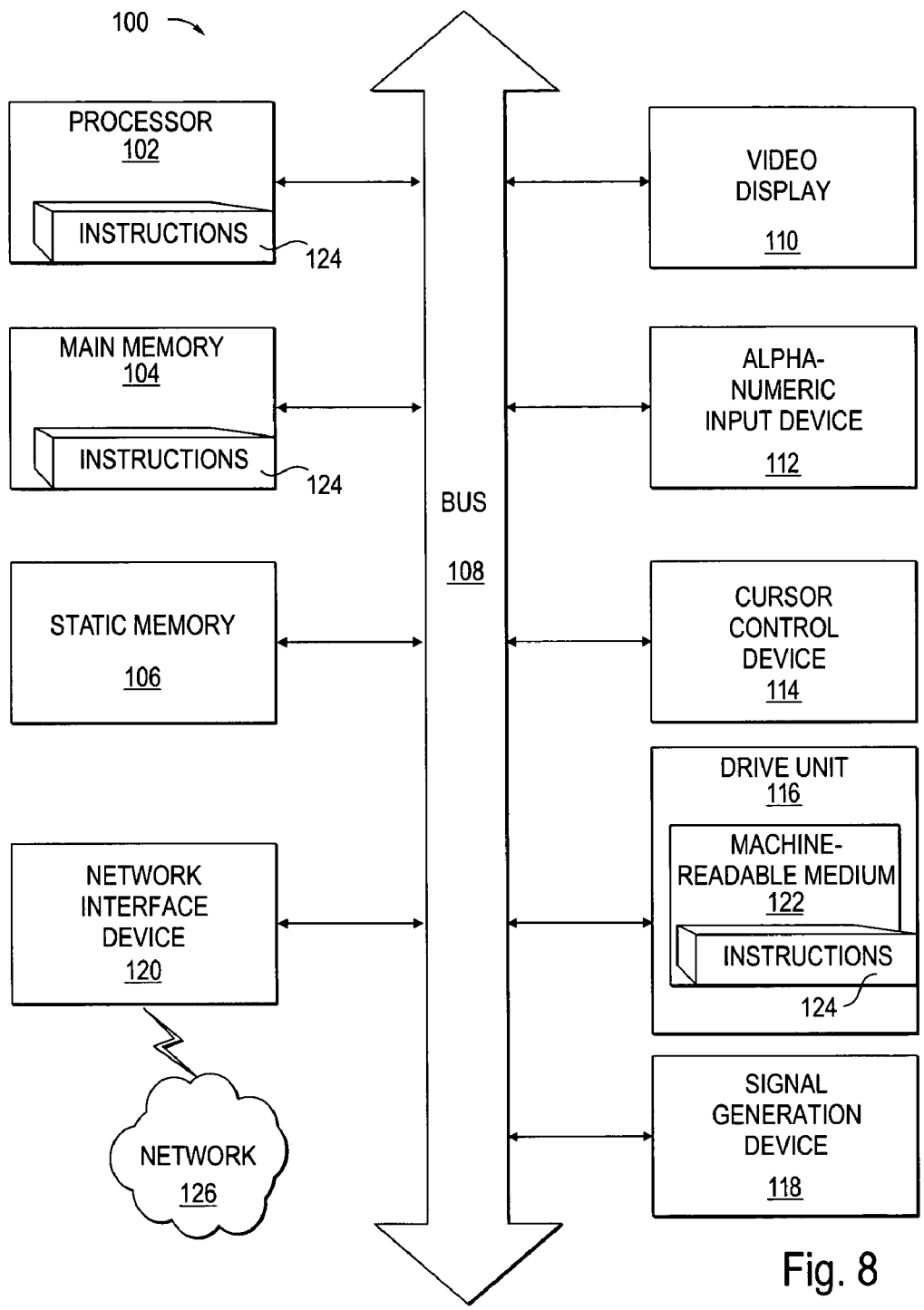
FIG. 8 is a schematic representation of a machine for executing a set of instructions to perform any one or more of the methodologies described herein.

FIG. 8 shows a diagrammatic representation of machine in the exemplary form of a computer system 100 within which a set of instructions, for causing the machine to perform any one or more of the methodologies discussed herein, may be executed. In alternative embodiments, the machine operates as a standalone device or may be connected (e.g., networked) to other machines, in a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a processor (e.g., a Central Processing Unit (CPU) 102 a Graphics Processing Unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120. The disk drive unit 116 includes a machine-readable medium 122 on which is stored one or more sets of instructions 124 (e.g., software) embodying any one or more of the methodologies or functions described herein. The software may also reside, completely or at least partially, within the main memory 104 and/or within the processor 102 during execution thereof by the computer system 100, the main memory 124 and the processor 102 also constituting machine-readable media.

The software may further be transmitted or received over a network 126 via the network interface device 102. While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions 124. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and system to bridge any one or more arbitrary source destinations to any one or more arbitrary sets of target destinations is provided. In one exemplary embodiment exemplary publish-subscribe and exemplary queuing messaging paradigms may be used simultaneously. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of communicating a message in a computer network, the method comprising:
    delivering, in parallel, the message from a sender application via both a first messaging paradigm and a second messaging paradigm, wherein the message is bridged prior to being processed via either first messaging paradigm or the second messaging paradigm, and wherein the message reaches both at least one original destination and at least one bridged destination;
    processing the message according to the first messaging paradigm, wherein the processing the message according to the first messaging paradigm comprises routing the message to the at least one original destination; and
    processing, on a parallel path, the message according to the second messaging paradigm, wherein the processing the message according to the second messaging paradigm comprises routing the message to the at least one bridged destination associated with the at least one original destination, and wherein a bridge associates a first of the at least one original destinations with a first of the at least one bridged destination.

2. The method of claim 1, wherein the bridge is a software bridge.

3. The method of claim 1, wherein the at least one original destination comprises a plurality of original destinations, and the software bridge associates the plurality of original destinations with the first bridged destination.

4. The method of claim 1, wherein the at least one bridged destination comprises a plurality of bridged destinations, and wherein the software bridge associates the first original destination with the plurality of bridged destinations.

5. The method of claim 1, wherein a plurality of messages are routed to the first original destination, and the software bridge selects the message from the plurality of messages.

6. The method of claim 5, wherein the processing the message according to the second messaging paradigm further comprises determining that the first bridged destination is permitted to receive the message.

7. The method of claim 1, wherein a configuration file comprises the software bridge.

8. The method of claim 1, wherein an administrator console comprises the software bridge.

9. The method of claim 1, wherein the first messaging paradigm and the second messaging paradigm utilize Java messaging.

10. A non-transitory machine-readable medium embodying a sequence of instructions that, when executed by a computer, causes the computer to perform operations comprising:
    delivering in parallel the message from a sender application via both a first messaging paradigm and a second messaging paradigm, wherein the message is bridged prior to being processed via either the first messaging paradigm or the second messaging paradigm, and wherein the message reaches both at least one original destination and at least one bridged destination;
    processing the message according to the first messaging paradigm, wherein the processing the message according to the first messaging paradigm comprises routing the message to at least one original destination; and
    processing, on a parallel path, the message according to the second messaging paradigm, wherein the processing the message according to the second messaging paradigm comprises routing the message to at least one bridged destination associated with the at least one original destination, and wherein a bridge associates a first of the at least one original destinations with a first of the at least one bridged destination.

11. The non-transitory machine-readable medium of claim 10, wherein the first messaging paradigm comprises a topic-based publish-subscribe messaging paradigm, the sender application comprises a publishing application, the message is associated with a topic, and the processing the message according to the first messaging paradigm comprises routing the message to a publish module.

12. The non-transitory machine-readable medium of claim 11, the operations further comprising:
    aborting delivery of the message unless the at least one original destination and the at least one bridged destination are configured to receive the message.

13. The non-transitory machine-readable medium of claim 11, wherein the processing the message according to the first messaging paradigm further comprises delivering the message to a number of subscriber applications that are registered to receive messages associated with the topic.

14. The non-transitory machine-readable medium of claim 11, wherein the second messaging paradigm comprises a queuing messaging paradigm.

15. The non-transitory machine-readable medium of claim 10, wherein the number of subscriber applications is zero.

16. The non-transitory machine-readable medium of claim 10, wherein the first messaging paradigm comprises a queuing messaging paradigm and the processing the message according to the first messaging paradigm comprises routing the message to a queue module.

17. The non-transitory machine-readable medium of claim 16, wherein the processing the message according to the first messaging paradigm further comprises delivering the message to a queue consumer.

18. The non-transitory machine-readable medium of claim 16, wherein the second messaging paradigm is a topic-based publish-subscribe messaging paradigm.

19. A system to communicate a message in a computer network, the system comprising:
- a processor;
- a memory element; and
- a server configured to perform operations, the operations comprising:
  - delivering in parallel with a bridge the message from a sender application via both a first messaging paradigm and a second messaging paradigm, wherein the message is bridged prior to being processed via either first messaging paradigm or the second messaging paradigm, and wherein the message reaches both at least one original destination and at least one bridged destination;
  - processing the message according to the first messaging paradigm, wherein the processing the message according to the first messaging paradigm comprises routing the message to at least one original destination; and
  - processing, on a parallel path, the message according to the second messaging paradigm, wherein the processing the message according to the second messaging paradigm comprises routing the message to at least one bridged destination associated with the at least one original destination, and wherein a bridge associates a first of the at least one original destinations with a first of the at least one bridged destination.

20. The system of claim 19, wherein the bridge is a software bridge.

21. The system of claim 20, wherein the first messaging paradigm comprises a topic-based publish-subscribe messaging paradigm, and the second messaging paradigm comprises a queuing messaging paradigm.

* * * * *